United States Patent [19]

Hikosaka et al.

[11] Patent Number: 4,908,059
[45] Date of Patent: Mar. 13, 1990

[54] PROCESS FOR MELTING COLD IRON MATERIAL

[75] Inventors: Akihide Hikosaka, Mishima; Tsuyoshi Mimura, Kobe; Tomio Suzuki, Kobe; Takeo Yoshigae, Kobe; Shuzo Ito, Kobe, all of Japan

[73] Assignee: Kabushiki Kaisha Kobe Seiko Sho, Kobe, Japan

[21] Appl. No.: 302,355

[22] Filed: Jan. 27, 1989

[30] Foreign Application Priority Data

Jan. 29, 1988 [JP] Japan .................................. 63-20167

[51] Int. Cl.⁴ ............................................. C21B 11/00
[52] U.S. Cl. ............................................. 75/43; 75/445; 75/48
[58] Field of Search .................... 75/38, 40, 43, 44 R, 75/44 S, 91, 48; 266/160, 901

[56] References Cited

U.S. PATENT DOCUMENTS

| | | | |
|---|---|---|---|
| 2,040,651 | 5/1936 | Frankl | 75/40 |
| 4,220,469 | 9/1980 | Tippmer | 75/91 |
| 4,309,024 | 1/1982 | Lillybeck et al. | 75/44 R |
| 4,381,938 | 5/1983 | Claflin | 75/91 |

Primary Examiner—Melvyn J. Andrews
Attorney, Agent, or Firm—Oblon, Spivak, McClelland, Maier & Neustadt

[57] ABSTRACT

Described herein is a process for melting iron material in the production of molten iron, in which cold iron material such as scraps, cold pig iron or reduced iron is charged into a melting furnace, the process comprising: feeding a carbon-containing solid material into a precombustion vessel for primary combustion therein with supply of an oxygen-containing gas with an oxygen content corresponding to 0.4 to 0.9 of theoretical air ratio; separating combustion residues of the carbon-containing solid material from the resulting hot reducing gas; and introducing the reducing gas into the melting furnace for secondary combustion therein with supply of an oxygen-containing gas holding an oxygen concentration corresponding to 0.7 to 1.3 of theoretical air ratio in total with the oxygen-containing gas supplied to the precombustion furnace.

7 Claims, 11 Drawing Sheets

PROCESS FOR MELTING COLD IRON MATERIAL

BACKGROUND OF THE INVENTION

1. Field of the Invention

This invention relates to a process for producing molten iron by melting cold iron material such as scraps, cold pig iron, reduced iron and the like, and more particularly to a process for producing molten iron of low sulfur level economically by the use of relatively inexpensive solid carbon-containing substances. The product molten iron is suitable for use as a raw material in steel making or as a raw material for casting.

2. Prior Art

Electric furnaces are generally used in the art for producing molten iron, especially for producing molten steel from cold iron material such as scraps, cold pig iron, reduced iron and the like. However, since electric power is very costly as an energy source, there have been demands for establishment of substitutive technology which permits to melt iron-making material by the use of an energy source which is available stably at low cost. As examples of such an energy source, coal, coke and low-grade solid carbon-containing substances are conceivable.

On the other hand, cupola-furnaces have been used since old days for melting cold iron material by the use of solid carbon-containing material. Cupola is a relatively simple equipment which is suitable for small-scale production of pig iron but requires lumpy coke of appropriate sizes for maintaining gas flows in the furnace and of high strength to endure the load of charged iron source. These requirements impose great restrictions on the material to be used and also lead to an increase in production cost.

A technology aiming at solution of this problem is found, for example, in Japanese Patent Publication No. 59-44363 disclosing a method of providing a space above molten iron phase in a furnace, and charging scraps and a carbon-containing substance into the molten iron while blowing an oxygen-containing gas thereinto to combust the carbon-containing substance. This method permits to use a carbon-containing substance of any shape as it is directly charged into the molten iron and a space for combustion of CO gas is provided over the molten iron phase. With regard to the technology of enhancing the charging amount of scraps in the field of iron making by converter, there has been proposed a method in Japanese Patent Publication No. 56-8085 in which a carbon-containing substance is replenished to molten iron as a heat source while an oxygen-containing gas is supplied to urge decarbonization reaction, combusting the resulting gas on the molten iron phase.

There has also been proposed a method of combusting a carbon-containing substance by the use of a burner instead of directly charging a carbon-containing substance into molten iron as in the above-described methods. For example, the top blowing lance of a converter is arranged to have a burner construction thereby burning the carbon-containing material and heating and melting scraps from above by the combustion heat.

Of the above-mentioned conventional methods, the method of directly charging carbon-containing substance into molten iron has various demerits resulting from accumulation of ash and sulfur contents of the carbon-containing material. Namely, the ash content in carbon-containing material normally consists of acidic components, mainly $SiO_2$, and scarcely contains basic components, so that a large amount of fluxing agents such as burned lime and dolomite has to be used for adjustment of basicity of the slag to be produced. Consequently, the operation involves an increased amount of slag, increasing the quantity of heat which is carried away with the slag and therefore raising the consumption of the carbon-containing material. Besides, the S concentration in molten iron is increased by the sulfur content in the carbon-containing material, necessitating to use a large amount of desulfurizer or to effect desulfurization outside the furnace.

The diagram of FIG. 7 shows variations in ash content in coal in relation with the amount of fluxing agents (burned lime and dolomite) and the amount of coal to be used. As seen therein, the amounts of fluxing agents and coal increase with the ash content in coal. FIG. 8 shows the relationship between the sulfur concentrations in coal and molten iron. The sulfur concentration in molten iron increases with the sulfur content in coal. Gathering from these, it is desirable to use coal with low ash and sulfur contents, which is however too costly to adopt as a practical solution means.

In case of the method in which solid carbon-containing material is completely burned in gas streams, it is necessary to provide a sufficient space for the combustion. One can easily comply with this requirement equipment-wise. However, in the method using a burner which is fueled by carbon-containing substance, difficulties are encounted in securing a sufficient space for complete combustion due to existence of scraps packed in the furnace, and combustible smoke is likely to be generated. Conversely, where the burner is located away from scraps for the purpose of achieving complete combustion, there arises the problem of inferior heat transfer efficiency.

Thus, when combusting solid carbon-containing material to melt iron-making material, it is required to enhance the combustion efficiency to attain a high utilization rate while removing the ash and sulfur contents efficiently.

The present inventors disclosed "Method and Apparatus for Blowing Solid Fuel into Electric Furnaces & Converters" in our prior application, Japanese Laid-Open Patent Application No. 62-267407.

The invention of this prior application concerns the improvement of power consumption in electric furnaces and low-cost heat compensation in converters, namely, it is restricted to an auxiliary measure of replacing part of the processing heat source by a solid fuel. In contrast, the present invention contemplates to get all the heat power necessary for melting cold iron sources solely from solid carbonaceous material, covering a different range of application.

Therefore, in the present invention it is necessary to enhance the efficiency of heat supply from the solid carbonaceous material to melt the iron source in a melting furnace in a more assured manner, restricting the air ratios in primary and secondary combustion stages.

Although the process of the above-mentioned prior application is directed specifically to electric furnaces and converters, the present invention is not restricted to the furnaces of these types.

The product of the process in the prior application is molten steel, while the product of the present invention is molten iron, especially molten iron with C concentration higher than 2%.

The present invention combines desulfurization in a precombustion vessel to solve the problems resulting from the use of solid carbonaceous material, permitting to produce molten iron of high quality. This is because the problem of S content is important in the present invention where a carbonaceous material as mentioned in above is used in a wide range (i.e., in a larger amount).

Further, we have filed a patent application (Japanese Laid-Open Patent Application No. 63-28818 for "Method and Apparatus for Blowing Fuel into Electric Furnaces & Converters". In this prior application, the fuel is burned completely outside a furnace, and the spent gas is blown against the raw material in the electric furnace or converter, without the concept of primary and secondary combustions as in the present invention.

We have also filed a patent application (Japanese Laid-Open Patent Application No. 63-72814) for "Electric Furnace Steel Making Process". As the title implies, this application is directed to a process by electric furnace into which combustion exhaust gas is blown similarly to the just-mentioned prior application, likewise without the concept of primary and secondary combustions as in the present invention.

SUMMARY OF THE INVENTION

It is an object of the present invention to provide a process for melting cold iron material, which overcomes the above-discussed problems of prior art processes.

In accordance with the present invention, there is provided a process for producing molten iron from cold iron material such as scraps, cold pig iron, reduced iron and the like by charging same into a melting furnace, the process comprising: subjecting solid carbon-containing material to primary combustion in a precombustion vessel by the use of an oxygen-containing gas with an oxygen content corresponding to 0.4 to 0.9 of theoretical air ratio; separating combustion residue of the solid carbon-containing material from the resulting hot reducing gas; introducing the reducing gas into a melting furnace to effect secondary combustion and melt the cold iron material with supply of an oxygen-containing gas to hold an oxygen concentration corresponding to 0.7 to 1.3 of theoretical air ratio totalling the oxygen-containing gas supplied to the precombustion vessel.

The above and other objects, features and advantages of the invention will become apparent from the following description and the appended claims, taken in conjunction with the accompanying drawings.

PARTICULAR DESCRIPTION OF THE INVENTION

Figure 1:
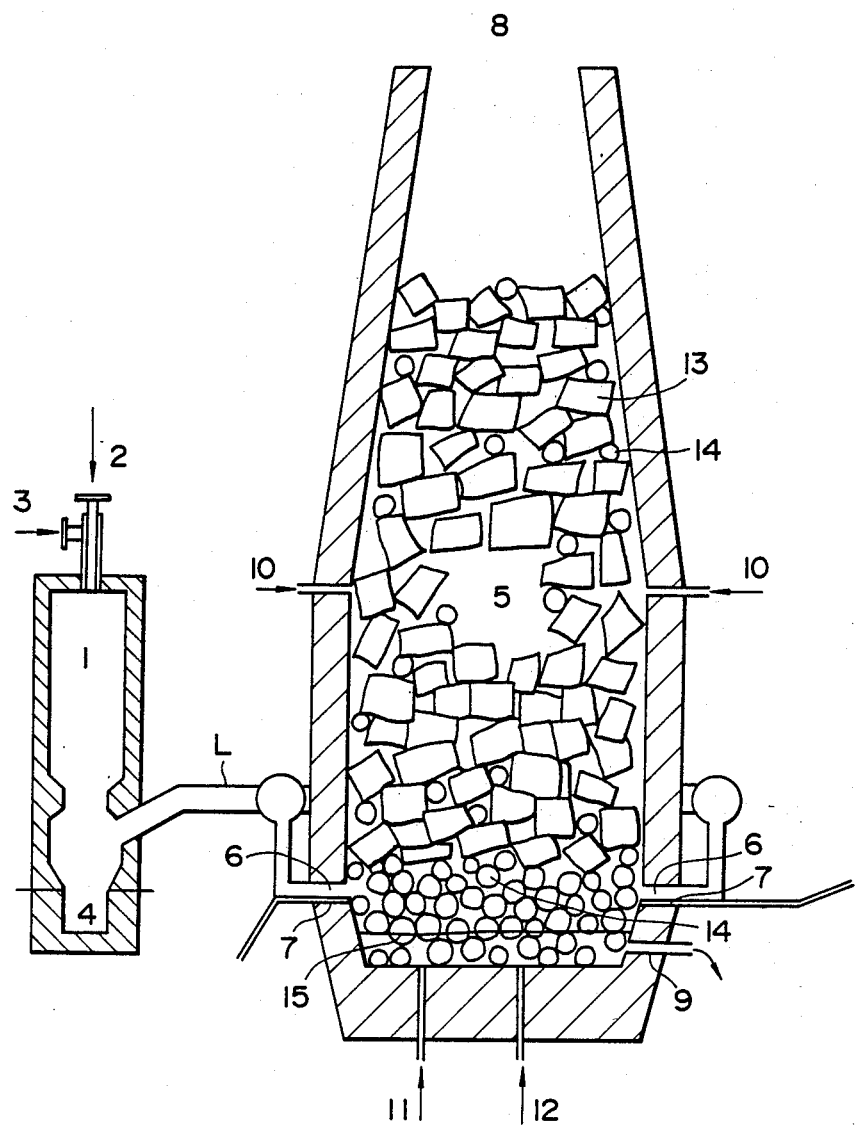
FIG. 1 is a schematic illustration showing an example of apparatus for carrying out the process of the invention.

Referring to FIG. 1, there is schematically shown an example of the melting apparatus suitable for carrying out the process of the present invention, including a precombustion vessel 1 and a melting furnace 5 lined with refractory material and interconnected by a hot gas introduction line L of refractory material or of water-cooled construction. As major components, the apparatus includes an ash collecting pot 4, a hot reducing gas injection hole 6, molten iron and slag outlet 9, oxygen injection holes 7, 10 and 11, and a powdery carbon-containing material injection hole 12.

When putting into practice the process of the present invention by the use of the above-described apparatus, a carbon-containing material is blown into the precombustion vessel 1 through an injection hole 2 while oxygen containing gas (oxygen, air, steam and/or the like) is blown in through an injection hole 3 to burn the carbon-containing material within the precombustion vessel. As a result, a reducing gas of high calorific value, mainly consisting of CO and $H_2$, is produced in the precombustion vessel 1, and the hot reducing gas is introduced into the melting furnace 5 through the introduction line L. In this instance, if the oxygen containing gas is introduced into the precombustion vessel tangentially around the streams of the injected carbon-containing material as described in our prior application (Japanese Laid-Open Patent Application No. 62-267407), the combustion gas streams are imparted with whirling force, and most of the ash content in the carbon-containing material is separated toward the inner wall surfaces of the precombustion vessel by the centrifugal force of the swirling streams and lowered therealong to drop into the ash collecting pot 4. Consequently, the ash content can be completely removed from the hot reducing gas. At this time, the sulfur content in the carbon-containing material can be simultaneously removed by introducing a desulfurizing agent such as limestone and burned lime into the precombustion vessel 1 together with the carbon-containing material, blowing into the melting furnace a clean hot reducing gas with extremely small ash and sulfur contents.

The hot reducing gas which has been introduced into the melting furnace 5 in this manner produces is subjected to secondary combustion with supply of secondary combustion oxygen (pure oxygen, air or the like) which is blown into the melting furnace 5 through the secondary combustion oxygen injection holes 7 and lower oxygen injection hole 11, thereby producing a large quantity of heat to melt the iron material 13. The sensible heat of the combustion gas is spent to preheat the iron material phase 13 in the melting furnace as it climbes up therethrough, being lowered in temperature until it is discharged through the furnace top. Even though lowered, the exhaust gas still has latent heat based on its reducibility, so that it is possible to enhance the preheating effect by further supply oxygen and combusting it while climbing through the iron material phase. The exhaust gas may be passed through a heat exchanger to utilize its surplus heat for preheating oxygen-containing gas for the primary or secondary combustion if desired.

Figure 7:
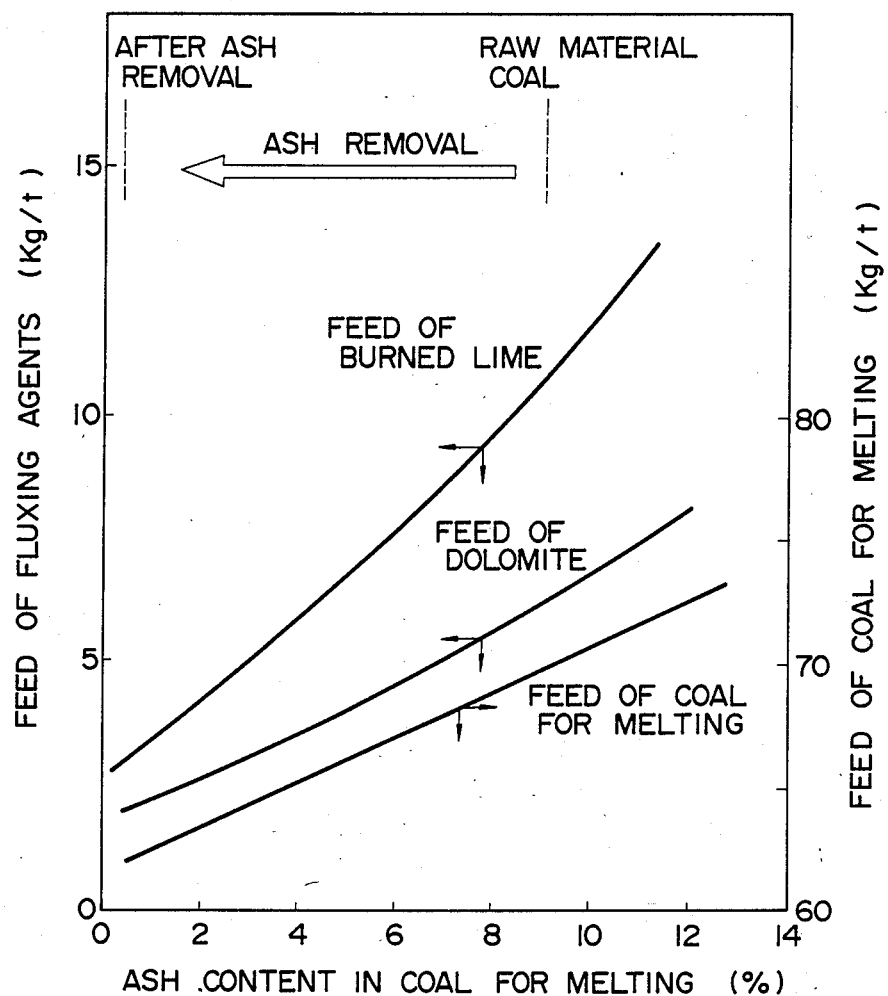
FIG. 7 is a diagram showing the influence of the ash content in coal on the consumptions of fluxing agents and coal.

As described above, the process of the invention makes it possible to melt iron-making material by efficient combustion of cheap carbon-containing solid material, removing beforehand the ash and sulfur contents which would bring about problems if the carbon-containing solid material were directly injected into molten iron, and as a result enhancing the melting effects. Namely, as shown in the diagram of FIG. 7, its ash-removing effects are reflected by reductions in the amount of fluxing agents required, the amount of slag and the amount of carbon-containing solid material. For example, in a case using coal with a 9.1% ash content as the carbon-containing solid material, 95% removal of the ash content will lead to about 70% and 11% reductions in the amount of fluxing agents and the amount of coal permitted for melting, respectively.

Figure 2:
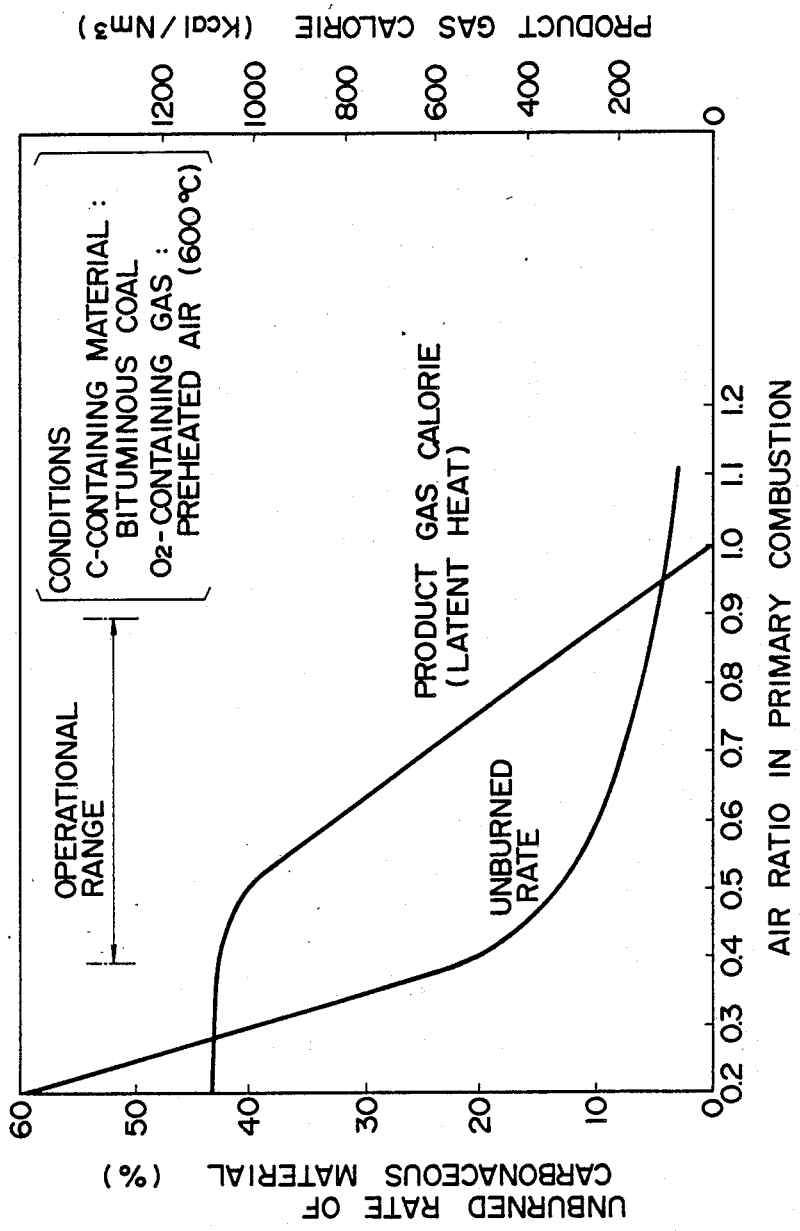
FIG. 2 is a diagram showing the air ratio in the precombustion vessel in relation with unburned rate of carbon-containing material and calorific value of the product gas.
Figure 3:
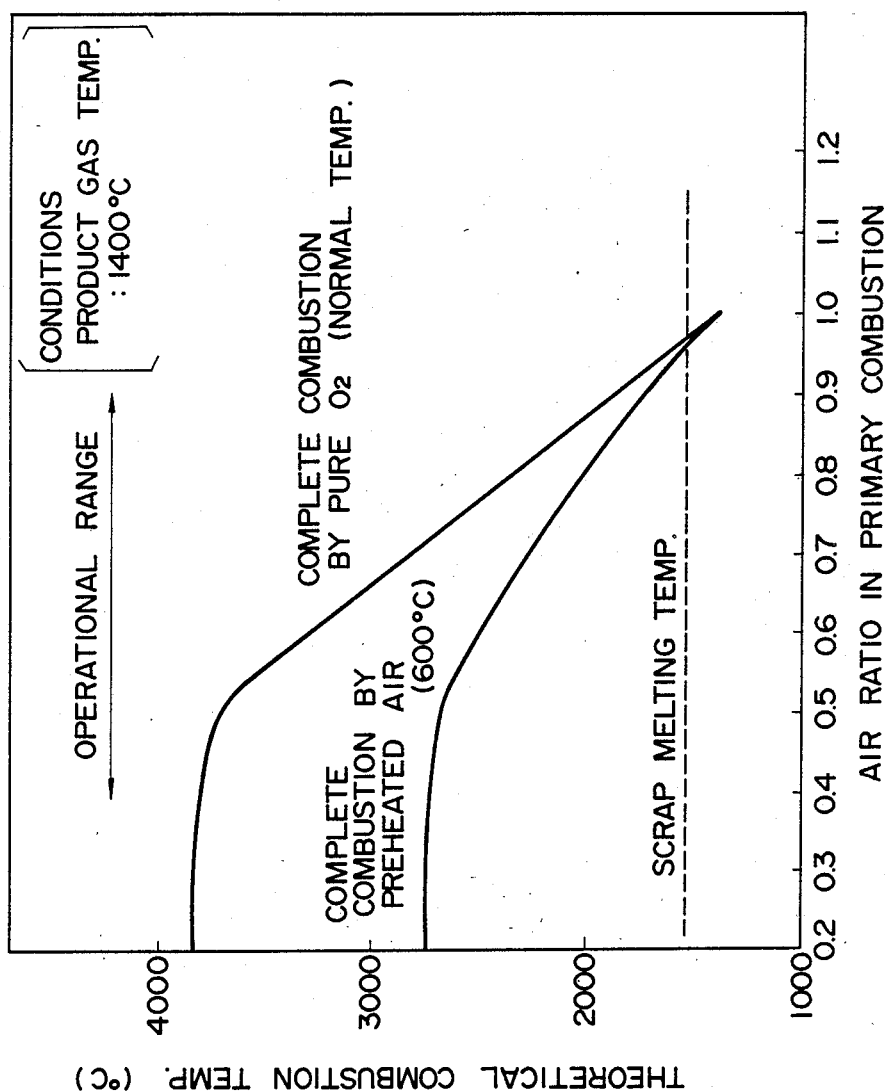
FIG. 3 is a diagram showing the air ratio in the precombustion vessel in relation with the theoretical combustion temperature of the product gas.

In the present invention, the amount of oxygen which is blown into the precombustion vessel 1 for primary combustion has an influence on the calorific value of the reducing gas to be produced, and on the combustion efficiency of the carbon-containing solid material. FIG. 2 shows variations in air ratio (quantity of injecting oxygen) in relation with the calorific value of the product gas and the rate (unburned rate) of combustible carbon components collected in the pot in unburned state. With an air ratio smaller than 0.4, the unburned rate increases abruptly, causing a considerable loss to the carbon source. On the other hand, with an air ratio higher than 0.9, the unburned rate is small but the product gas becomes a gas of low calorific value mainly composed of $CO_2$ and $H_2O$. FIG. 3 shows the theoretical combustion temperature which is reached when the gas is burned completely by the secondary combustion in the melting furnace. In case the air ratio in the primary combustion is high, the theoretical combustion temperature in the secondary combustion drops sharply to make it difficult to melt the iron material efficiently. Therefore, the air ratio in the precombustion vessel should be in the range of 0.4–0.9, preferably in the range of 0.4–0.6.

Figure 4:
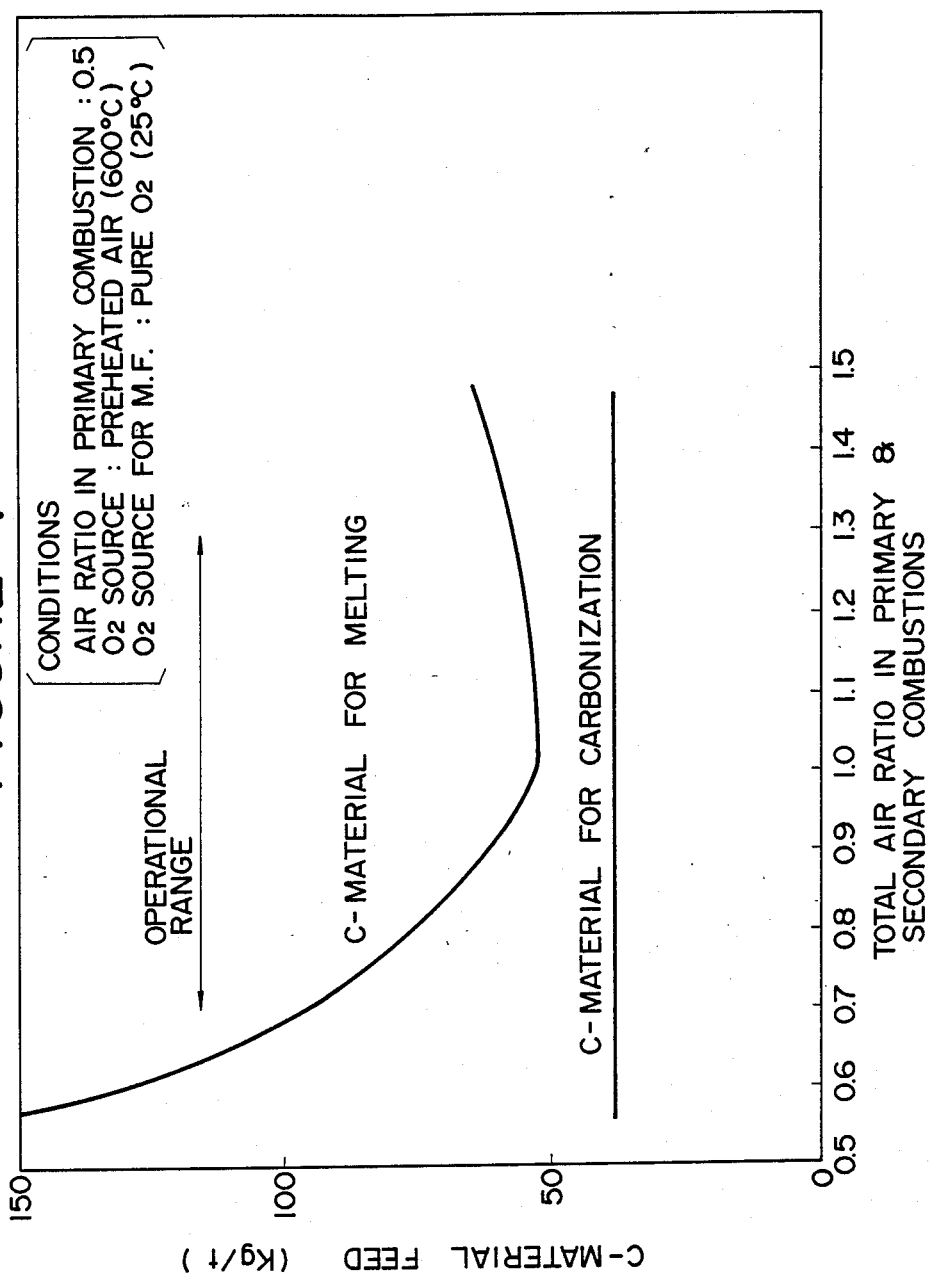
FIG. 4 is a diagram showing the total air ratio in the precombustion vessel and melting furnace in relation with the consumption of carbonaceous material.

The reducing gas produced in the precombustion vessel by the above-described method is introduced into the melting furnace preferably immediately without cooling, and an oxygen-containing gas is supplied to the melting furnace for the secondary combustion, melting the iron-making material with the heat produced by the secondary combustion. The oxygen-containing gas to be supplied for the secondary combustion may be suitably selected from pure oxygen, oxygen-enriched air, preheated air and the like, and its feed rate is determined in terms of the total amount including the oxygen-containing gas fed to the precombustion vessel. In this regard, FIG. 4 shows the relationship between the total air ratio and the consumption of the carbon-containing material (coal in this particular example) in a case where the air ratio in the precombustion vessel is 0.5 and the resulting gas is burned in the secondary combustion in the melting furnace. When the air ratio is smaller than 0.7, the consumption of coal increases sharply. If the air ratio exceeds 1.3, the amount of exhaust gas increases, carrying away a greater amount of heat therewith and therefore increasing the coal consumption. Further, when the air ratio is too high, there arises a problem that the iron material is oxidized to an increased degree to lower the iron yield. Gathering from these, the amount of the oxygen-containing gas to be supplied to the melting furnace should be controlled to the range of 0.7–1.3 in total with the oxygen-containing gas supplied to the precombustion vessel.

Figure 5:
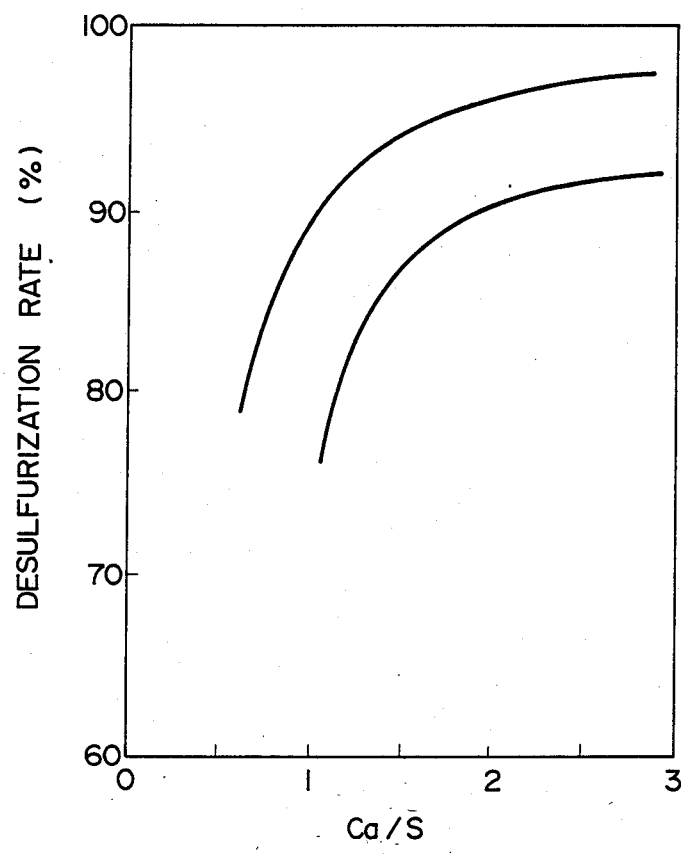
FIG. 5 is a diagram showing the relationship between Ca/S ratio and desulfurization rate in the precombustion vessel.
Figure 6:
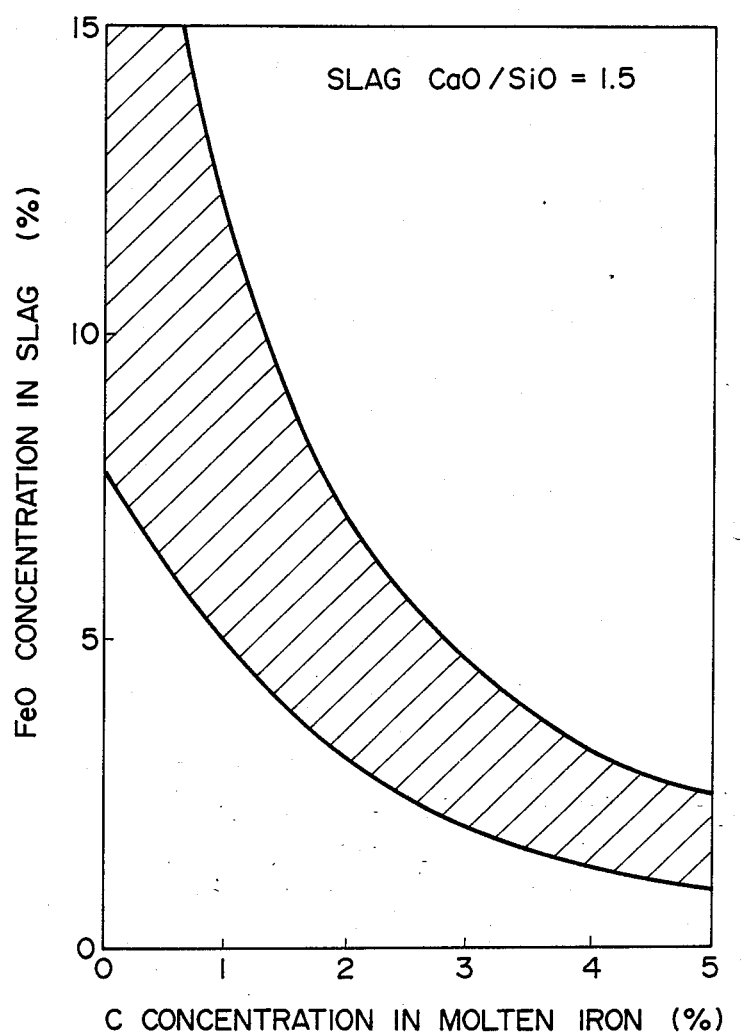
FIG. 6 is a diagram showing the relationship between C concentration in molten iron and FeO concentration in slag in the melting furnace.
Figure 8:
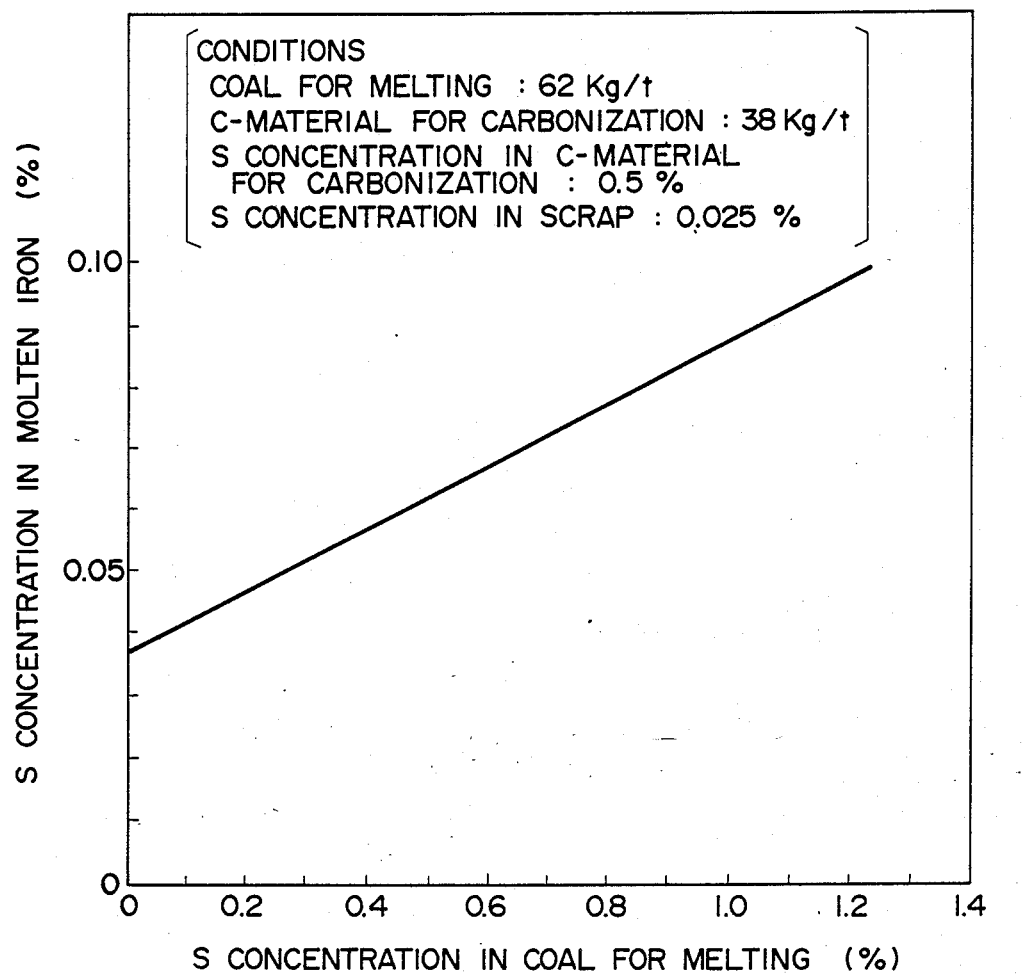
FIG. 8 is a diagram showing the influence of S concentration in coal used for melting on S concentration in molten iron.

The process of the invention which has the above-described basic configuration can enhance the sulfur removing effects by blowing in Ca components such as limestone and burned line together with the carbon-containing material. The diagram of FIG. 5 shows this effect, in which the horizontal axis represents the molar ratio (Ca/S ratio) of the sulfur content brought in by the carbon-containing material to the Ca content in the desulfurizing agents (limestone and burned lime) introduced into the precombustion vessel, and the vertical axis represents the desulfurization rate. As clear from this figure, a desulfurization rate higher than 85% is obtained when the Ca/S ratio is greater than 1, permitting to remove the sulfur content of the carbon-containing material by adding limestone or burned lime simultaneously with the carbon-containing material. The desulfurization rate drops sharply when the Ca/S ratio is smaller than 1, and the desulfurization effect becomes saturated when the Ca/S ratio is greater than 3. Accordingly, it is preferred to have a Ca/S ratio of 1 to 3 in terms of the consumption of the desulfurizing agent. As a result of such a desulfurizing treatment, the S concentration in molten iron can be lowered even when a carbon-containing material with a large sulfur content is used, as shown in FIG. 8, allowing to omit or lessen the fluxing agents necessary for desulfurization of molten iron as well as the step of desulfurization treatment.

Figure 9:
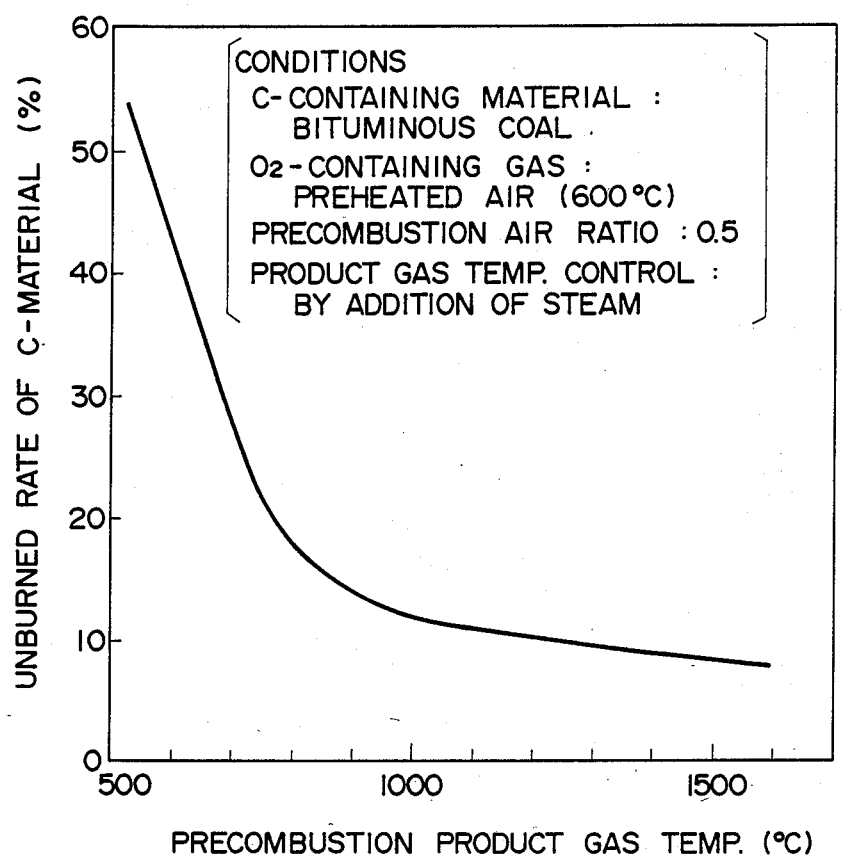
FIG. 9 is a diagram showing the relationship between the product gas temperature in the precombustion vessel and unburned rate of the solid carbon-containing material.
Figure 10:
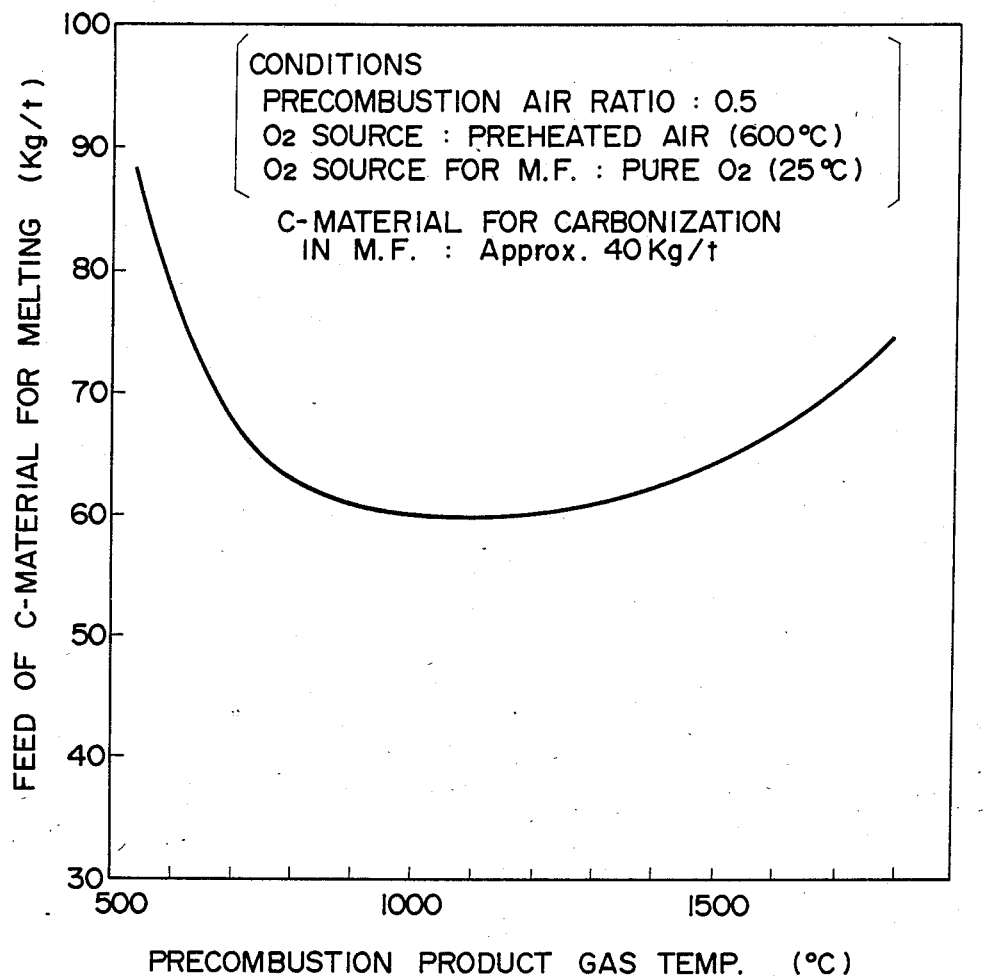
FIG. 10 is a diagram showing the relationship between the product gas temperature in the precombustion vessel and consumption of the solid carbon-containing material.
Figure 11:
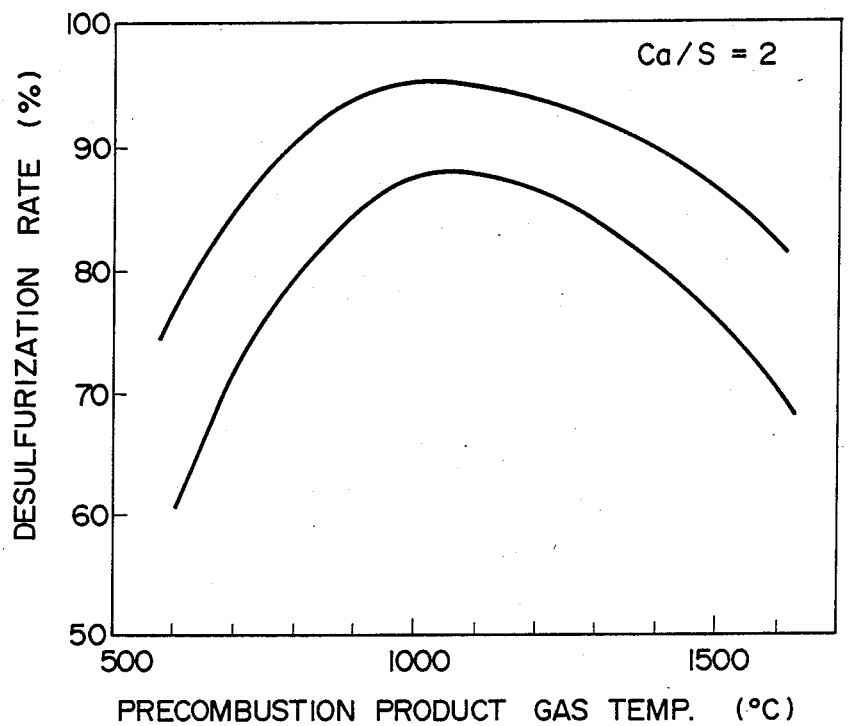
FIG. 11 is a diagram showing the relationship between the product gas temperature in the precombustion vessel and desulfurization rate.

In the present invention, the temperature of the reducing gas which is produced in the precombustion vessel 1 is an important factor for enhancing the efficiency of the process as a whole, and therefore it should be controlled to an appropriate range to obtain predetermined effects. Shown in FIG. 9 are variations in rate of carbon (combustible) which is collected in the pot in unburned state, in relation with the product gas temperature in the precombustion vessel 1. When the product gas temperature is at a high level, the solid carbon-containing material undergoes combustion at a high velocity, showing a low unburned rate. However, as the product gas temperature is lowered to 700°–800° C., the unburned rate is increased to a marked degree, causing a considerable loss of carbon source. On the other hand, when the product gas temperature is at a high level, the heat losses in the precombustion vessel and the conduit leading to the melting furnace become greater, increasing the consumption of the solid carbon-containing material as shown in FIG. 10 in addition to increased wear of refractory material in the precombustion vessel which will lead to an increase in the consumption of the refractory material. Further, the desulfurization of the product gas by limestone or burned lime in the precombustion vessel is effected most efficiently at the temperature of about 1000° C. as seen in FIG. 11, and becomes less efficient at either higher or lower temperatures. Therefore, it is important to control the precombustion gas temperature to the range of 700°–1500° C. to produce economically high quality molten iron low sulfur content by the use of carbon-containing solid material as a heat source, which is the main object of the invention.

The control of the product gas temperature can be made easily by changing the preheating temperature of the oxygen-containing gas for the primary combustion or by varying its oxygen concentration. In this regard, it is also effective to blow steam into the precombustion vessel to induce the following water gasification reaction, an endothermic reaction, by the use of the combustion heat of the carbon-containing material, thereby cooling the product gas while increasing its calorific value.

$$C + H_2O = CO + H_2 \quad (I)$$

In a case where water gas is produced by addition of steam, it becomes necessary to add an oxygen source of a quantity suitable for burning the gas to the air ratio for the secondary combustion.

For introducing the produced reducing gas from the precombustion vessel into the melting furnace through an inlet which is provided over the molten bath in the lower portion of the furnace, preferably feeding an oxygen-containing gas for the secondary combustion simultaneously through the just-mentioned inlet. By so doing, the reducing gas and the oxygen-containing gas are mixed and combusted sufficiently, utilizing the resulting heat effectively for melting the iron-making material. While climbing up the furnace, the gases which have undergone the combustion preheat the iron material filled in the furnace, and as a result the gas temperature drops to a level approximately lower than 1000° C. before leaving through the furnace top. By this process, the chemical heat of the carbon-containing solid material can be fully utilized for preheating and melting the iron-making material.

The oxygen-containing gas to be introduced into the melting furnace is normally supplied at a position close to the gas inlet hole which receives the product gas of the precombustion vessel. However, in a case where lumpy coal or coke is packed in a lower portion of the melting furnace, $CO_2$ or $H_2O$ gas which is once produced by the secondary combustion is reduced by the coal or coke and has a composition with a relatively large combustible content at the furnace top. Therefore, it is desirable to feed part of the oxygen-containing gas through an upper side wall portion of the melting furnace as shown in FIG. 1 for accelerating the gas combustion.

The carbon concentration in the product molten iron can be controlled over a wide range by adjusting carbonization of the molten iron on the hearth portion of the furnace. Shown in FIG. 7 is the relationship between the carbon concentration in molten iron and FeO concentration in slag. As clear from this figure, the FeO concentration in slag increases as the carbon concentration in molten iron drops, increasing the iron loss. Accordingly, it is preferred to carbonize to hold the carbon concentration in the molten iron in the range of from 2% to a point of saturation, more specifically, to 5%. It is also desirable to blow part of the oxygen-containing gas into the molten iron to stir it more vigorously, thereby to enhance the function of collecting oxidized iron components in reduced form.

For carbonizing the molten iron at the hearth of the melting furnace, it is suitable to adopt a method of blowing powdery coal or coke into the molten iron through the bottom of the furnace, entrained on streams of nitrogen gas, inert gas or air. The molten iron is automatically carbonized in a case where lumpy coal or coke is packed in the hearth portion of the furnace.

In the process of the invention, the ash content of the carbon-containing material is almost completely removed in the precombustion vessel. In such a case, however, slag is produced from the acidic oxide components in a small amount of carbon-containing material which is used for carbonization and in the gangue contents in the reduced iron which is used as an iron source. Therefore, by adding limestone or burned lime through the furnace top, these acidic oxides can be neutralized simultaneously with refining of the molten iron. The basicity ($CaO/SiO_2$) of slag is suitably in the range of 0.8 to 2.0 from the standpoint of protection of refractory material, dephophorization and desulfurization.

EXAMPLES

Following are examples of producing molten iron from iron-making material by the process of the invention constituted by a precombustion vessel and a melting furnace.

FIG. 1 shows the equipments used, omitting the injection hole for blowing coal or coke dust into the molten iron indicated at 12.

Table 1 below shows the composition of raw materials used in the examples.

Table 2 shows the results of the examples of the invention, along with the results of a comparative example employing coke alone in a melting furnace without using a precombustion vessel. The respective factors are indicated in terms of consumption per ton of product molten iron. Preheated air of 600° C. was used in the precombustion vessel in both Examples 1 and 2, and limestone for desulfurization was added in relation with S content in coal to hold $Ca/S = 2$. As a result, a desulfurization of about 90% was obtained.

In the precombustion vessel (PV), steam was added to adjust the product gas temperature to 1400° C., and the resulting reducing gas was immediately introduced into the melting furnace (MF) without cooling, effecting the secondary combustion in the furnace to produce heat for melting scraps. Coke was used in the melting furnace in both Examples 1 and 2 for carbonizing molten iron while securing gas permeability in the furnace.

TABLE 1

| | Composition of Raw Material | | | | | | | |
|---|---|---|---|---|---|---|---|---|
| Iron source | C<br>0.4 | Si<br>0.35 | Mn<br>0.80 | P.<br>0.025 | S<br>0.025 | | | |
| | T.C | S | VM | Ash | CaO | $SiO_2$ | $Al_2O_3$ |
| Coal (to PV) | 76.4 | 0.5 | 33 | 9.1 | 0.5 | 4.9 | 3.1 |
| Coke (to MF) | 83.0 | 0.5 | <2 | 12.8 | 0.5 | 6.3 | 3.5 |
| | CaO | $SiO_2$ | MgO | | | | | |

TABLE 1-continued

| Composition of Raw Material | | | |
|---|---|---|---|
| Limestone | 54.9 | 0.4 | 0.7 |
| Burned lime | 94.1 | 9.4 | 0.8 |
| Dolomite | 65.5 | 0.3 | 31.2 |

Pure oxygen of normal temperature was used as an oxygen source for the melting furnace in Example 1, while preheated air of 600° C. was used in Example 2. Same results were obtained in Example 2 except that the gas velocity was larger because of a greater gas quantity, and the spent gas temperature was higher than in Example 1, with an increase in coal consumption. On the other hand, in Comparative Example performing the operation in a manner similar to the conventional cupola without using a precombustion vessel, coke and scraps were charged into the smelting furnace and coke was burned by supply of 600° C. preheated air to melt the scraps. The coke consumptions in Examples of the invention were markedly reduced compared with Comparative Example, permitting to use cheap coal as a substitute. Besides, the consumption of fluxing agents such as limestone and dolomite can be saved by about 60%, in addition to the effects of lowering the S concentration in the molten iron.

TABLE 2

| | Results of Examples | | |
|---|---|---|---|
| | Example 1 | Example 2 | Compr. Example |
| Coal | 61.9 kg/t | 64.5 kg/t | — |
| Limestone | 2.0 kg/t | 2.1 kg/t | — |
| Preheated air | 213 Nm$^3$/t | 222 Nm$^3$/t | — |
| Steam | 0.6 kg/t | 0.6 kg/t | — |
| Air ratio | 0.51 | 0.51 | — |
| Product gas quanity | 291 Nm$^3$/t | 303 Nm$^3$/t | — |
| Product gas temp. | 1405° C. | 1398° C. | — |
| Scrap | 978 kg/t | 978 kg/t | 977 kg/t |
| Coke | 38 kg/t | 38 kg/t | 107 kg/t |
| Burned lime | 2.8 kg/t | 2.8 kg/t | 10.8 kg/t |
| Dolomite | 2.0 kg/t | 2.0 kg/t | 6.2 kg/t |
| Oxygen | 54 Nm$^3$/t | 8 Nm$^3$/t | 0 Nm$^3$/t |
| Preheated air | — | 266 Nm$^3$/t | 502 Nm$^3$/t |
| Air ratio* | 0.90 | 0.90 | 0.90 |
| Molten iron temp. | 1471° C. | 1465° C. | 1475° C. |
| Molten iron (C) | 3.0% | 3.1% | 3.0% |
| Molten iron (S) | 0.037% | 0.039% | 0.061% |
| Slag | 11.3 kg/t | 11.8 kg/t | 32 kg/t |
| Export gas | 303 Nm$^3$/t | 493 Nm$^3$/t | 514 Nm$^3$/t |
| Export gas temp. | 698° C. | 771° C. | 724° C. |

*In total with the precombustion vessel.

EFFECTS OF THE INVENTION

It will be appreciated from the foregoing description that, in producing molten iron by melting iron material, application of the process according to the present invention makes it possible to utilize cheap carbon-containing solid material, especially fine coal dust to a maximum degree. Besides, the process of the invention eliminates the problems which arise from the use of fine coal dust, such as the improvement in heat efficiency and removal of ash content and sulfur contents, realizing operations of high heat efficiency reductions in various consumptions.

What is claimed is:

1. In a melting process for the production of molten iron wherein iron material, is charged into a melting furnace, the improvement in said process which comprises feeding a carbon-containing solid material along with a oxygen-containing gas, having an oxygen content corresponding to the air ratio of 0.4 to 0.9, into a precombustion vessel and effecting therein a primary combustion yielding a hot reducing gas containing combustion residues; separating said residues from said hot reducing gas and, then introducing the thus obtained hot reducing gas along with an oxygen-containing gas having an oxygen content corresponding to the air ratio of 0.7 to 1.3, in total with the oxygen-containing gas supplied to the precombustion vessel, into a melting furnace and effecting therein a secondary combustion.

2. The process of claim 1, wherein a Ca-containing material selected from the group consisting of limestone and burned lime is added as a desulfurizing agent to said primary combustion of said carbon-containing solid material in said precombustion vessel in an amount suitable for holding a molar ratio of Ca content in said desulfurizing agent to S content in said carbon-containing material (Ca/S) in a range between 1 and 3, inclusive, separating said desulfurizing agent from the product gas.

3. The process of claims 1 and 2, wherein said oxygen-containing gas to be supplied to said primary combustion of said carbon-containing solid material in said precombustion vessel is selected from the group consisting of pure oxygen, oxygen-enriched air and preheated air with or without addition of steam, controlling the oxygen concentration of said oxygen-containing gas, preheating temperature and additive amount of steam to hold the product gas temperature in the range of from 700° C. to 1500° C.

4. The process of claim 3, wherein said carbon-containing solid material is pulverized coal or coke, and blown into said precombustion vessel entrained on streams of nitrogen gas, inert gas or air.

5. The process of claim 4 wherein said melting furnace has an inlet portion and a hearth portion located at the bottom and wherein said inlet portion is located above said hearth portion, and wherein the product gas from said precombustion vessel is introduced into said melting furnace through said inlet while simultaneously supplying pure oxygen, oxygen-enriched air or preheated air through said inlet as said oxygen-containing gas.

6. The process of claim 5, wherein the molten iron in said hearth portion of said melting furnace is carbonized to a carbon concentration range of from 2% to a saturating point.

7. The process of claim 6, wherein pulverized coal or coke is blown into the molten iron in the hearth portion of said melting furnace, entrained on streams of nitrogen gas, inert gas or air.

* * * * *